Jan. 2. 1945.   T. E. FOULKE ET AL   2,366,250
METHOD FOR PURIFYING TUNGSTIC ACID
Filed Feb. 20, 1941
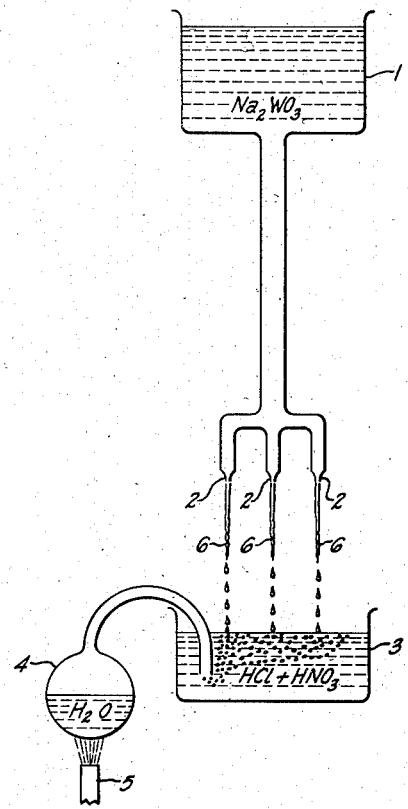
Inventors:
Ted E. Foulke,
Helen M. Holtan,
by John H. Anderson
Their Attorney.

Patented Jan. 2, 1945

2,366,250

UNITED STATES PATENT OFFICE 2,366,250

METHOD FOR PURIFYING TUNGSTIC ACID

Ted E. Foulke, Mayfield, Ohio, and Helen M. Holtan, Brooklyn, N. Y., assignors to General Electric Company, a corporation of New York Application February 20, 1941, Serial No. 379,904

1 Claim. (Cl. 23—140)

Our invention relates to a process for producing tungstic acid of a high degree of purity such as that of quality suitable for use in the manufacture of certain fluorescent tungstates (phosphors). The invention consists in certain new and novel steps and processes hereinafter described.

In the manufacture of certain fluorescent tungstates, magnesium tungstate for example, it is imperative to use tungstic acid of a very high degree of purity if phosphors having a useful degree of brightness are to be obtained. It is an object of this invention to provide a new and improved process whereby tungstic acid of a higher degree of purity than that hitherto obtainable may be produced. Further objects and advantages of our invention will be apparent from the following detailed description and from the drawing which shows schematically an apparatus used in carrying out the processes of the invention.

Generally speaking, the objects of the invention are attained by precipitating tungstic acid from solution in a finely divided and bulky or flocculent form which settles rapidly, filters quickly, and which may be easily washed free of any contaminating by-products of the reaction. Such form, we find, is the unhydrated or anhydrous form of tungstic acid, $H_2WO_4$, and may be obtained by precipitating the acid from a mixture of sodium tungstate and another acid under the conditions hereinafter prescribed.

For the purposes of our improved process, we convert tungstic acid of the highest commercially available degree of purity into sodium tungstate. This procedure comprises mixing the aforesaid relatively impure tungstic acid with a heated solution of sodium carbonate in stoichiometric proportions to produce sodium tungstate and carbonic acid. After the sodium tungstate has been thus prepared, it is dropped while relatively hot through a capillary tube or nozzle into a boiling solution of hydrochloric acid and nitric acid, into which it is thus introduced in a fine state of division. The latter requirement as to the state of division we have found to be extremely important if the above described finely divided flocculent precipitate of tungstic acid is to be obtained. If the sodium tungstate leaves the orifice of the capillary tube and enters the acid solution as a thick stream, a gummy precipitate or even one which is hard and rock-like will form. This undesirable form of tungstic acid is hydrated and is believed to have the formula $H_2WO_4 \cdot H_2O$. Such a product is practically useless for manufacturing fluorescent powders, since it cannot be washed free of the by-products of the reaction such as the sodium chloride and sodium nitrate. It is very essential that such contaminating ingredients do not find their way into the phosphor which is to be produced, otherwise the brightness of the phosphor will be materially impaired. If, however, the sodium tungstate is added slowly and in a relatively dispersed state so that it is immediately and intimately mixed with the acid, a precipitate of the desired fineness and looseness will form.

Apparently the criterion for the production of a precipitate of the type desired is whether or not the sodium tungstate stream in entering the acid bath depletes the solution of acid radicals in the immediate vicinity of the point of entry. If the stream is wide, its outer portions tend to deplete the acid and deprive the inner portions of acid radicals with which to react. This is especially true if the acid is weak. The result is that the hydrated tungstic acid forms. It is this form which produces the undesirable dense precipitates. On the other hand, if the stream enters the acid in a finely dispersed state, all of its particles will rapidly come into contact with an abundance of acid radicals. Under these conditions, a finely divided and flocculent form of unhydrated tungstic acid will form. This form is readily freed of impurities by washing.

Referring to the drawing, the mixing apparatus there shown comprises the storage chamber 1 provided with one or more capillary outlets 2 through which the sodium tungstate liquor in the chamber 1 may drop to the vessel 3, which contains the above described mixture of hydrochloric and nitric acids. The vessel 3 is provided with a steam generator 4 for the purpose of maintaining the acid in a continuous state of ebullition with live steam. The water in the generator 4 may be heated to the boiling point by any suitable source of heat 5. The steam bubbles passing through the acid solution aid in insuring rapid and intimate mixing of the sodium tungstate and the acid at the point of entry of the tungstate into the acid.

We have found the character of the flow of the sodium tungstate streams 6 to be very critical for the production of a tungstic acid precipitate of the type desired. This will be readily understood from what has already been said about the necessity for having the streams 6 enter the acid solution in a highly dispersed state. If the pressure head, the density of the sodium tungstate liquor, the height of the fall of the streams 6 and the diameter of the capillary 2 are so proportioned that the streams 6 have changed from a steady flow state of discrete individual droplets, as shown in the drawing, to a broken and dispersed state before they reach the vessel 3, then the sodium tungstate will enter the body of acid in a finely divided form. If, on the other hand, the density of the liquor or the size of the orifices 2 are too great or if the height of fall is too small, this condition will not obtain. Similarly, the pressure of the main body of liquid within the chamber 1 will have its effect in determining whether or not the condition will obtain. Generally speaking, by placing the capillary jets close to the liquid, a hard or gummy precipitate will be produced and, conversely, the further away it is placed the softer the precipitate will be. Yet very large distances will also have a deleterious effect, since under those conditions a greenish and hard precipitate may form. This is probably due to the fact that in falling through large distances the sodium tungstate liquor cools too much. The liquor should be relatively hot when it enters the acid bath. Similar deleterious effects will be experienced if the streams 2 are allowed to contact the side walls of the vessel 3.

I have found by experiment several values of the proper height of the capillary orifice above the acid bath for giving good precipitates. In the following table these values are given as a function of the rate of flow of the sodium tungstate.

| Height of capillary ($x$) | Rate of flow ($R$) |
|---|---|
| | Cc./min. |
| 10″ | 20 |
| 22″ | 52 |
| 50″ | 480 |

It can be shown that these data obey approximately the equation $R = 9.1 \times 1.083^x$ where $R$ represents rate of flow in cubic centimeters per minute, and $x$ the height of the capillary from the liquid surface in inches.

A complete set of operating conditions for giving a very good precipitate is as follows:

Height of capillary tube, 27 inches.
Bore of capillary tube, 2.0 mm.
Capillary orifice drawn down to deliver 60–70 cc. per minute.
1300 cc. of 1.20 specific gravity $Na_2WO_4$ solution poured into a 2000 cc. flask connected to the capillary tube.
732 cc. of HCl (2% of $HNO_3$ by volume) 1.12 specific gravity heated by steam in a 21 litre Pyrex jar 8¾ inches in diameter, a quartz steam generator being used.
Bubbling continued for at least two minutes after precipitation has stopped.
Free fall (from orifice to surface of acid) 22 to 23 inches.
Decant after settling.
Wash 4 times with 1750 cc. boiling water containing 2½% HCl.
Wash 2 times with 1750 cc. boiling water containing 2½% $HNO_3$.
Wash 1 time with 1750 cc. boiling water (distilled $H_2O$ used throughout).
Dry on Buchner filter and in oven 110° C. for 15 hours.

As already stated, some relation exists between the quantity of liquid to be precipitated, the height of free fall in air, the pressure head, and the delivery rate. In addition, the hydrochloric acid should be maintained at a high temperature (fuming) and constantly agitated with the live steam. For the best results it was found that the specific gravity of the sodium tungstate solution was more favorable if held in the range 1.20 to 1.22, and the specific gravity of the hydrochloric acid held closely to the value given. It will be understood, however, that other values of these quantities may be used if corresponding compensations are made in the other conditions, as the rate of flow, etc. Further improvement may be obtained by recrystallizing the sodium tungstate and dissolving the crystals before precipitation.

We find that by the foregoing process we are able to produce tungstic acid of a much higher degree of purity than has heretofore been available commercially. The improved quality has enabled us to produce magnesium tungstate phosphors which are measurably brighter because of the absence of impurities in the tungstic acid used in their manufacture.

It may be reiterated, in conclusion, that the main aspect of the invention lies in producing effective dispersion of the sodium tungstate so that the acid and the sodium tungstate will mix sufficiently rapidly to produce the flocculent precipitate which may be readily washed free of contaminating by-products. The best results are also somewhat dependent on a favorable choice or control of the concentrations or specific gravities of the tungstate solution and of the acid bath, as well as of the temperature conditions of the reaction and of the conditions that control dispersion of the tungstate when brought into reaction with the acid. It will be understood, therefore, that the described example represents but one such choice, and that many variations in the densities and modifications in the manner of introducing the sodium tungstate in dispersed form will occur to those skilled in the art to which the invention appertains. Further, many alternative methods of preparing the sodium tungstate prior to its introduction into the acid bath may be used, provided that a high degree of purity is obtained. All such variations and modifications we aim to include within the scope of the appended claim. As will be apparent from the claim, also, our invention is not in its broader aspects dependent on the use of particular tungstate(s) or of particular acid(s), although for various reasons sodium tungstate and hydrochloric acid may ordinarily be preferred.

What we claim as new and desire to secure by Letters Patent of the United States is:

A method of producing anhydrous tungstic acid in bulky, loose, finely divided form, by reaction between a tungstate solution and a solution of another acid, which comprises introducing the tungstate solution into a hot, agitated body of the acid solution in the form of hot discrete droplets of a size and degree of dispersion approximately the same as is produced by dropping the tungstate solution from a capillary tube into the acid at a rate which corresponds to the equation $R = (9.1)(1.083)^x$, where $R$ is the rate of flow in cubic centimeters per minute and $x$ is the height in inches of the orifice of the capillary above the surface of the acid.

TED E. FOULKE.
HELEN M. HOLTAN.